US009959774B2

(12) United States Patent
Vasek et al.

(10) Patent No.: US 9,959,774 B2
(45) Date of Patent: May 1, 2018

(54) SYSTEMS AND METHODS FOR DISPLAYING OBSTACLE-AVOIDANCE INFORMATION DURING SURFACE OPERATIONS

(71) Applicant: Honeywell International Inc., Morristown, NJ (US)

(72) Inventors: Jiri Vasek, Brno (CZ); Ratan Khatwa, Sammamish, WA (US); James C. Kirk, Clarksville, MD (US); Olukayode Olofinboba, Eden Prairie, MN (US); Pavel Kolcarek, Brno (CZ); Tomas Svoboda, Brno (CZ); Matej Dusik, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 1208 days.

(21) Appl. No.: 13/764,701

(22) Filed: Feb. 11, 2013

(65) Prior Publication Data
US 2013/0321176 A1 Dec. 5, 2013

Related U.S. Application Data
(60) Provisional application No. 61/706,632, filed on Sep. 27, 2012.

(51) Int. Cl.
G08G 5/04 (2006.01)
G01S 13/93 (2006.01)
(Continued)

(52) U.S. Cl.
CPC ............ G08G 5/04 (2013.01); G01S 13/93 (2013.01); G01S 13/931 (2013.01);
(Continued)

(58) Field of Classification Search
None
See application file for complete search history.

(56) References Cited

U.S. PATENT DOCUMENTS 6,118,401 A  9/2000  Tognazzini
6,433,729 B1 * 8/2002  Staggs ............ G01S 7/12
                                              342/179
(Continued)

FOREIGN PATENT DOCUMENTS

CN  102428346   4/2012
JP  2003279375  10/2003
(Continued)

OTHER PUBLICATIONS

Examination Report from counterpart European Application No. 13168611.5, dated Jul. 22, 2014, 6 pp.
(Continued)

Primary Examiner — Firmin Backer
Assistant Examiner — Shawna M Kingston
(74) Attorney, Agent, or Firm — Shumaker & Sieffert, P.A.

(57) ABSTRACT

Systems and methods for aiding in pilot awareness of obstacles relative to aircraft features. An exemplary processor receives sensor information from one or more sensors mounted in an aircraft feature (e.g. light modules), determines if at least one obstacle is located within a predefined field of view based on the received sensor or database information and generates an image. The image includes an ownship icon having at least one feature representing wingtips of the aircraft and at least one indicator associated with the determined at least one obstacle. A display device presents the generated image. The display device presents a tip of a first sense coverage area adjacent to one wingtip feature associated with the port wing and a tip of the second sense coverage area adjacent to one wingtip feature associ-
(Continued)

ated with the starboard wing. The indicator is presented within at least one of the coverage areas.

19 Claims, 17 Drawing Sheets

(51) Int. Cl.
*G08G 5/00* (2006.01)
*G08G 5/06* (2006.01)

(52) U.S. Cl.
CPC ......... *G08G 5/0021* (2013.01); *G08G 5/0078* (2013.01); *G08G 5/045* (2013.01); *G08G 5/065* (2013.01); *G01S 2013/9335* (2013.01)

(56) References Cited

U.S. PATENT DOCUMENTS

| | | | |
|---|---|---|---|
| 7,055,994 B2 | 6/2006 | Martin | |
| 7,188,983 B2 | 3/2007 | Dunn | |
| 7,379,165 B2 | 5/2008 | Anderson et al. | |
| 7,579,980 B2 | 8/2009 | Anderson et al. | |
| 7,778,776 B2 * | 8/2010 | Goto | G05D 1/024 340/435 |
| 7,783,427 B1 | 8/2010 | Woodell et al. | |
| 7,869,305 B2 | 1/2011 | Anderson et al. | |
| 7,872,591 B2 * | 1/2011 | Kane | B61L 23/34 340/438 |
| 7,903,023 B2 | 3/2011 | Cornic et al. | |
| 8,103,438 B2 * | 1/2012 | Petrie | B60T 7/22 340/905 |
| 8,121,786 B2 | 2/2012 | Morbey et al. | |
| 2003/0222794 A1 | 12/2003 | Vial | |
| 2005/0007257 A1 | 1/2005 | Rast | |
| 2007/0067093 A1 * | 3/2007 | Pepitone | 701/120 |
| 2009/0164122 A1 | 6/2009 | Morbey et al. | |
| 2009/0174591 A1 | 7/2009 | Cornic et al. | |
| 2010/0219988 A1 | 9/2010 | Griffith | |
| 2010/0299067 A1 | 11/2010 | McCollough et al. | |
| 2011/0087417 A1 | 4/2011 | Anderson et al. | |
| 2011/0279304 A1 | 11/2011 | Yonemoto et al. | |

FOREIGN PATENT DOCUMENTS

| | | |
|---|---|---|
| JP | 2005241511 A | 9/2005 |
| WO | 2006027762 A1 | 3/2006 |

OTHER PUBLICATIONS

Response to Examination Report dated Jul. 22, 2014, from counterpart European Patent Application No. 13168611.5, dated Jan. 22, 2015, 14 pp.

Notification of Reason for Refusal and translation thereof, from counterpart Japanese Application No. 2013-111726, dated Feb. 20, 2017, 4 pp.

Search Report from counterpart European Application No. 13168611.5, dated Jun. 25, 2014, 3 pp.

First Office Action and Search Report, and translation thereof, from counterpart Chinese Application No. 01310381539.1, dated Jul. 5, 2016, 24 pp.

* cited by examiner

SYSTEMS AND METHODS FOR DISPLAYING OBSTACLE-AVOIDANCE INFORMATION DURING SURFACE OPERATIONS

This application claims the benefit of U.S. Provisional Application Ser. No. 61/706,632, the content of which is hereby incorporated by reference in its entirety. The entire content of U.S. Provisional Application Ser. No. 61/653,297, filed May 30, 2012, is also incorporated by reference herein.

BACKGROUND OF THE INVENTION

There is evidence provided by the National Transportation Safety Board (NTSB) that surface operations represent a significant damage risk because of the threat of wingtip collisions with objects in the wings' trajectory. Three main causes of surface accidents are identified in the NTSB database:

(1) failure to maintain adequate visual lookout,
(2) failure to perceive distance between the wings and obstacles, and
(3) failure to maintain required clearance.

SUMMARY OF THE INVENTION

The present invention provides systems and methods for aiding in pilot awareness of obstacles relative to aircraft wingtips. An exemplary processor receives sensor information from one or more sensors mounted in one or more wingtip light modules, determines if at least one obstacle is located within a predefined field of view based on the received sensor information and generates an image. The image includes an ownship icon having at least one feature representing wingtips of the aircraft and at least one indicator associated with the determined at least one obstacle. A display device presents the generated image. Other examples of implementation may include installation to different aircraft body parts to cover 360 degrees around the aircraft.

In one aspect of the invention, the generated image includes a first sense coverage area and a second sense coverage area. The display device presents a tip of the first sense coverage area adjacent the at least one wingtip feature associated with the port wing of the aircraft and a tip of the second sense coverage area adjacent the at least one wingtip feature associated with the starboard wing of the aircraft. The indicator is presented within at least one of the coverage areas.

In another aspect of the invention, the cones and the ownship icon are presented in a one-to-one relationship and the coverage areas and the ownship icon are presented in one of two different range resolutions.

In still another aspect of the invention, the at least one indicator includes uniquely depicting a range line or other type of icon of at least one of the coverage areas. The uniquely depicted range line corresponds to obstacle distance information included in the received sensor information.

In yet another aspect of the invention, the at least one indicator includes a distance value located in at least one of the coverage areas. The distance value corresponds to obstacle distance information included in the received sensor information.

In a further aspect of the invention, a memory stores airport facility information. The at least one indicator includes at least a partial outline of the at least one determined obstacle, based on at least one of the received sensor information or the stored airport facility information. The at least a partial outline is presented within at least one of the coverage areas.

In still a further aspect of the invention, the generated image includes a first zone associated with first areas outside the aircraft, the first areas being one where, if an obstacle was detected therein, the aircraft would avoid contact based on current heading of the aircraft; and a second zone associated with a second area outside the aircraft, the second area being one where, if an obstacle was detected therein, the aircraft would be likely to collide with the obstacle based on current heading of the aircraft.

In yet a further aspect of the invention, a first portion of the first zone and a first portion of the second zone are presented from a port wingtip of the ownship icon. A second portion of the first zone and a second portion of the second zone are presented from a starboard wingtip of the ownship icon.

In still yet another aspect of the invention, the at least one indicator includes a nearest obstacle icon presented in a first format in one of the zone portions based on the sensor information. The at least one indicator includes a next-nearest obstacle icon presented in a second format in one of the zone portions, based on the sensor information.

In still yet a further aspect of the invention, the at least one indicator includes a nearest obstacle icon in the first zone presented in a first format in one of the zone portions of the first zone, based on the sensor information. The at least one indicator includes a nearest obstacle icon in the second zone presented in a second format in one of the zone portions of the second zone, based on the sensor information.

In another aspect of the invention, the processor determines trajectory of each wingtip based on current aircraft speed and heading. The generated image includes a first wingtip vector generated, based on the determined trajectory of the associated wingtip; and a second wingtip vector generated, based on the determined trajectory of the associated wingtip. The wingtip vectors are based on at least one of a distance or time value.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
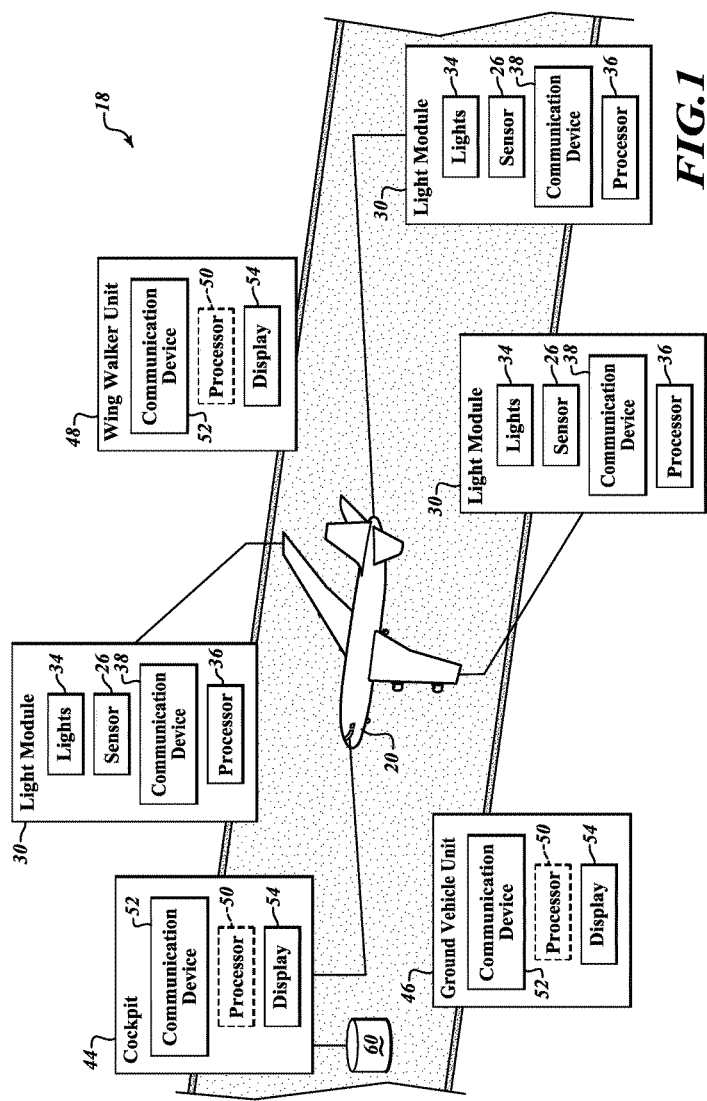
FIG. 1 is a block diagram of an exemplary system formed in accordance with an embodiment of the present invention.

In one embodiment, as shown in FIG. 1, an exemplary airport surface collision-avoidance system (ASCAS) 18 includes components on an aircraft 20 and may include components removed from the aircraft 20. The aircraft 20 includes sensors (e.g., emitter/sensor (i.e., radar)) 26 included within aircraft light modules 30. The light modules 30 also include navigation/position lights 34, a processor 36, and a communication device 38. The sensors 26 are in communication via the communication device 38 (wired or wirelessly) to one or more user interface (UI) devices 44-48.

In one embodiment, the UI devices 44-48 include a processor 50 (optional), a communication device (wired or wireless) 52, and an alerting device(s) (a display 54). The UI devices 44-48 for pilots and/or for ground crew (tug driver, wing-walkers, etc.) provide audio and/or visual cues (e.g., via headphones, PC tablets, etc.), based on sensor-derived and processed information.

Based on information from the sensors 26, the UI devices 44-48 provide some or all of the following functions: detect and track intruders, evaluate and prioritize threats, present a threat image, and declare and determine actions. Once an alert associated with a detection has been produced, then execution of a collision-avoidance action (e.g., stop the aircraft, maneuver around intruder, etc.) is manually performed by a pilot or tug driver, if in a towing situation, or automatically by an automation system (e.g., autobrakes).

In one embodiment, processing of the sensor information is done by the processor 36 at the sensor level and/or the processor 50 at the UI devices 44-48.

In one embodiment, situational awareness is improved by integration with automatic dependent surveillance-broadcast/traffic information service-broadcast (ADS-B/TIS-B), airport/airline information on vehicles/aircraft/obstacles (e.g., through WiMax), and with an airport moving map, synthetic vision system/enhanced vision system/combined vision system (SVS/EVS/CVS) received by the respective devices using the communication device 52.

In one embodiment, the present invention reduces false alarms by analyzing flight plan and taxi clearance information, and airport building/obstacle databases stored in memory 60 or received from a source, via the communication devices 52.

The sensors 26 included in the wings' and tail's navigation light modules provide near-complete sensor coverage of the aircraft 20. Full coverage can be attained by placing sensors in other lights that are strategically located on the aircraft 20.

The present invention provides different UI devices for different stakeholders: through electronic flight bag (EFB)/primary flight display (PFD)/multifunction display (MFD)/navigation display to pilots, EFB/headset to tug drivers, headset to wing-walkers, etc.

The pilot and tug driver are alerted aurally, visually, and/or tactilely. For example, a visual alert presented on an EFB display shows aircraft wingtips outlined or a highlight of any obstructions—see figures below for examples. Aural alerting may be through existing installed equipment, such as an interphone or other warning electronics or possibly the Crew Alerting System (CAS).

The fields of view (FOVs) of the sensors 26 included at the wingtips and tail provide ideal coverage of aircraft vicinity. The FOV parameters are derived from typical accident geometry and functional requirements. The blind-spot surrounding the aircraft is based on the FOV of one candidate technology (radar) and constraints associated with placing the radars inside the wing/tail navigation light modules 30. Other FOVs are possible, depending upon where one places the sensors 26.

In one embodiment, the thresholds for sensor FOV are assessed based on maximum and minimum stopping distances.

Maximum Distance:
The braking action is executed by aircraft.
Aircraft is moving by the ground speed of 16 m/s, which corresponds to the maximum assumed taxi speed. (Other threshold taxi speeds may be used)
Aircraft is moving on wet-poor runway with a corresponding airplane braking coefficient $\mu_B$=0.3. (The braking friction co-efficient varies as a function of present contaminants.)
Aircraft is producing zero lift.
No skid is assumed.

Minimum Distance:
The braking action is executed by aircraft.
Aircraft is moving by the ground speed of 1.4 m/s, which corresponds to the speed of the aircraft being pushed backward (e.g., fast human walk) (other speeds may be used).
Aircraft is moving on wet-poor runway with a corresponding airplane braking coefficient $\mu_B$=0.3 (depends upon surface condition).
Aircraft is producing zero lift.
No skid is assumed.

Aircraft braking coefficient ($\mu_B$) includes a coefficient summarizing the retarding forces acting on a wheel under braking. In one embodiment, $\mu_B = F_{braking}/(mg-L)$. Quantities are: $F_{braking}$—braking force, m—aircraft mass, L—lift, g—gravitational acceleration. The aircraft braking coefficient is not equivalent to the tire-to-ground friction coefficient. The estimated airplane braking coefficient is an all-inclusive term that incorporates effects due to the runway surface, contaminants, and airplane braking system (e.g., antiskid efficiency, brake wear).

The resulting time for executing corrective action is derived from the relationship between work and object energy.

The lift produced by the aircraft during slow motions can be ignored.

Braking distance is derived from the relation between work and energy.

Distance of uniformly decelerated motion is determined by substitution.

An equation for determining a resulting time needed to decelerate the aircraft at a given braking force is used to define the time needed to stop the aircraft during the highspeed taxi in the vicinity of the runway, as well as for determination of time to stop while the aircraft is being pushed back out of the gate.

Figure 3:
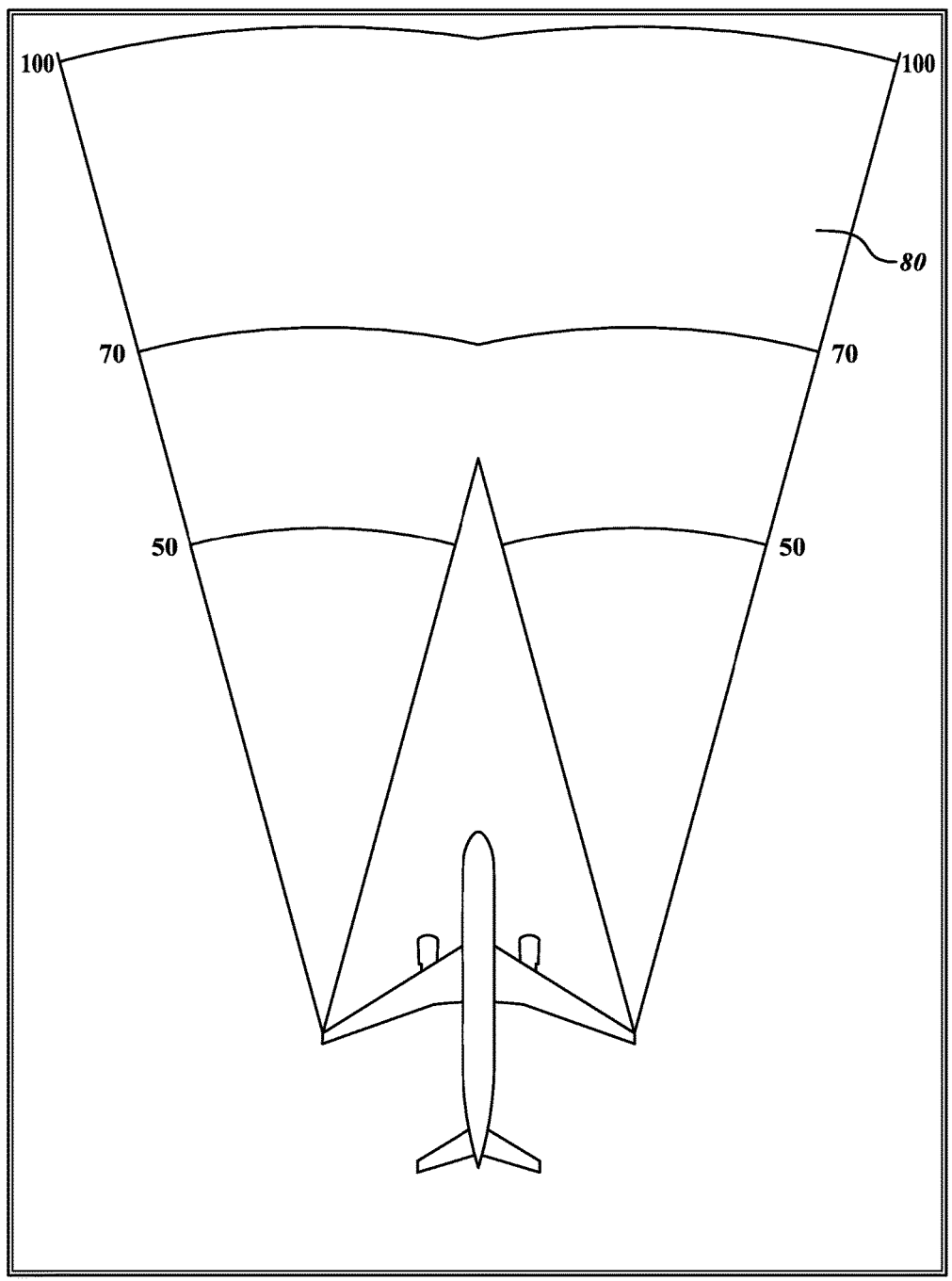
FIGS. 3-17 are screen shots of exemplary moving map images generated by the system shown in FIG. 1.

The communication devices 38 located in the light modules 30 are denoted as sensor wireless units (SWU) see FIG. 3. The data measured by the sensors 26 are transmitted by the SWUs to a gateway wireless unit (GWU) located somewhere close to or in the cockpit (e.g., the communication device 52 is located in the cockpit UI device 44). The GWU is connected to a central unit (i.e., the processor 50), which performs data processing and interfaces to the pilot or other personnel giving information about the surrounding obstacles.

Position and distance of detected obstacles are visually represented on an display such as alerting device display 54 (EFB, Navigation Display or heads-up display (HUD) with multiple alert modes (e.g., clear, caution, and warning modes). In case of an alert, a sound-beep is activated and is played using a crew-alerting system (CAS). If a caution level is reached, the frequency (time between beeps) of beeping is increased, changing into a continuous tone for warning level. The aural alert can be accompanied by a visual alert (graphical or textual).

In one embodiment, a voice command describing the position of the obstacle, based on processed sensor data, is played through the CAS when caution and warning alerts are active: "Left" —collision danger on left wing, "Right"

—collision danger on right wing, "Rear"—collision danger in rear part of fuselage (push-back operation).

The UI device for a tug tractor driver is similar to that for the aircraft crew, except that the application for visual modality is hosted on a handheld device or tablet.

The ASCAS configuration (number of sensors) can differ, depending upon the aircraft operator's preferences. Depending on the required level of protection, wireless radars could be added to other aircraft lights.

Figure 2:
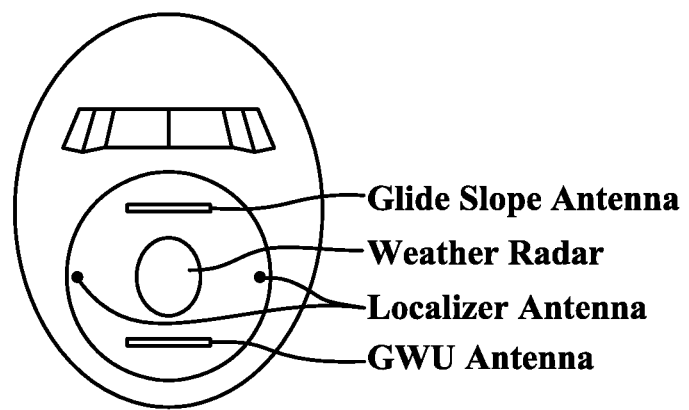
FIG. 2 is a front view of an aircraft fuselage formed in accordance with an embodiment of the present invention.

In one embodiment, an inside weather radar (WR) cone antenna is placed inside the nose weather radar cone—see FIG. 2. The GWU antenna(s) are mounted under the cone in such way that they would not influence the WR's performance. A single antenna is located on top or bottom of the WR compartment or two side-mounted antennas are used. An antenna may be shared with a GateLink antenna.

In one embodiment, the present invention provides systems and methods for presentation of obstacles relative to the wing trajectory to flight crew operators. The processor 36 or 50 receives data from the wingtip radar sensors 26 and configures the data for presentation on the cockpit display 54, represented by a stand-alone device (e.g., electronic flight bag (EFB)) or an integrated avionic display, with tailoring to match the different capabilities of the display systems. Other devices (e.g., 46, 48) with displays may be used, for example a Head Up Display (HUD).

The configured data for display includes a graphical presentation image in the 1:1 scale for the aircrew. The items that are presented in 1:1 scale include a radar cone or zone (radar angle of view covered by the sensor 26) and the graphical representation of the aircraft. The obstacles detected by the radar sensor 26 are placed into the radar cone, reflecting their relative distance from the predefined aircraft's body part. The objects are localized and placed on the image with respect to their real position in order to provide the aircrew with a valid picture of the location and distance of the obstacles outside the aircraft.

In one embodiment, the processor 36 or 50 is connected to the flight management system (FMS), navigation databases or other aircraft systems in order to provide dynamic alerting about obstacles in the vicinity, based on aircraft braking distance calculated with respect to the configuration of the aircraft's brakes, weight, and current speed, and surface conditions, etc. (note that some of this information might be entered manually by a crewmember). In one embodiment, the detected obstacles correlate with data in an obstacle database in order to provide additional information, for example, identification of the obstacle as an air traffic control (ATC) tower, hangar, etc. When the processor 36 or 50 receives information about the aircraft's trajectory, the obstacle alerts may also be based on the anticipated aircraft trajectory.

In one embodiment, an alerting device display provides information about the relative distance of the obstacles and informs the pilot about an obstacle in the vicinity, based on its position. If additional information like aircraft speed, weight, and brake configuration is available, braking distance is also calculated and presented.

In one embodiment, an aural component accompanies the display 54. The aural component is used to draw crewmembers' attention to the display 54 or includes a speech component that provides more specific instructions to crewmembers.

In one embodiment, the processor 36 or 50 uses dynamically calculated aircraft braking distance (time to collide with the obstacle, based on available information (e.g., configuration of brakes, weight, speed, surface conditions, trajectory, distance, etc.)). The processor 36 or 50 addresses potential collisions with all ground objects (obstacles), not only with ground vehicles.

In one embodiment, the display 54 operates in display modes with respect to the speed of the aircraft and current aircrew needs. When taxiing at low speeds, low-range mode is displayed, thus providing the aircrew with precise information about distance, shape, and position of different obstacles. In the second, high-speed mode, information about obstacles is reduced as a tradeoff for displaying obstacles and advisory for obstacles located further from the ownship. In this case, the radar sensor view angle is also reduced, which is reflected in the displayed image, as well.

FIG. 3 shows a normal mode image 80 in portrait view. The image 80 includes a left coverage area 84 that begins at the left wingtip of an aircraft icon 82 and a right coverage area 86 that starts at the right wingtip of the aircraft icon 82. The coverage areas 84, 86 include arced distance lines that are based on distances from the host aircraft. When an obstacle is detected by the processor 36 or 50, it is identified by the distance to the obstacle in meters or feet. As the distance to the obstacle decreases, the time to collide with the object decreases and one or more notifications are provided to the pilot using predetermined algorithms. A basic implementation might base notifications on the obstacle distance only, while an advanced implementation incorporates aircraft speed, configuration of other aircraft systems, and/or environmental factors like surface conditions, in the algorithms.

The display 54 may be presented on the primary field of view, to the pilot, integrated with information from other avionics systems. Information from the sensors 26 is merged with object data (lighting system, hangar, tower, etc.) from a local database 60 to provide enhanced obstacle awareness for the flight crew.

Figure 4:
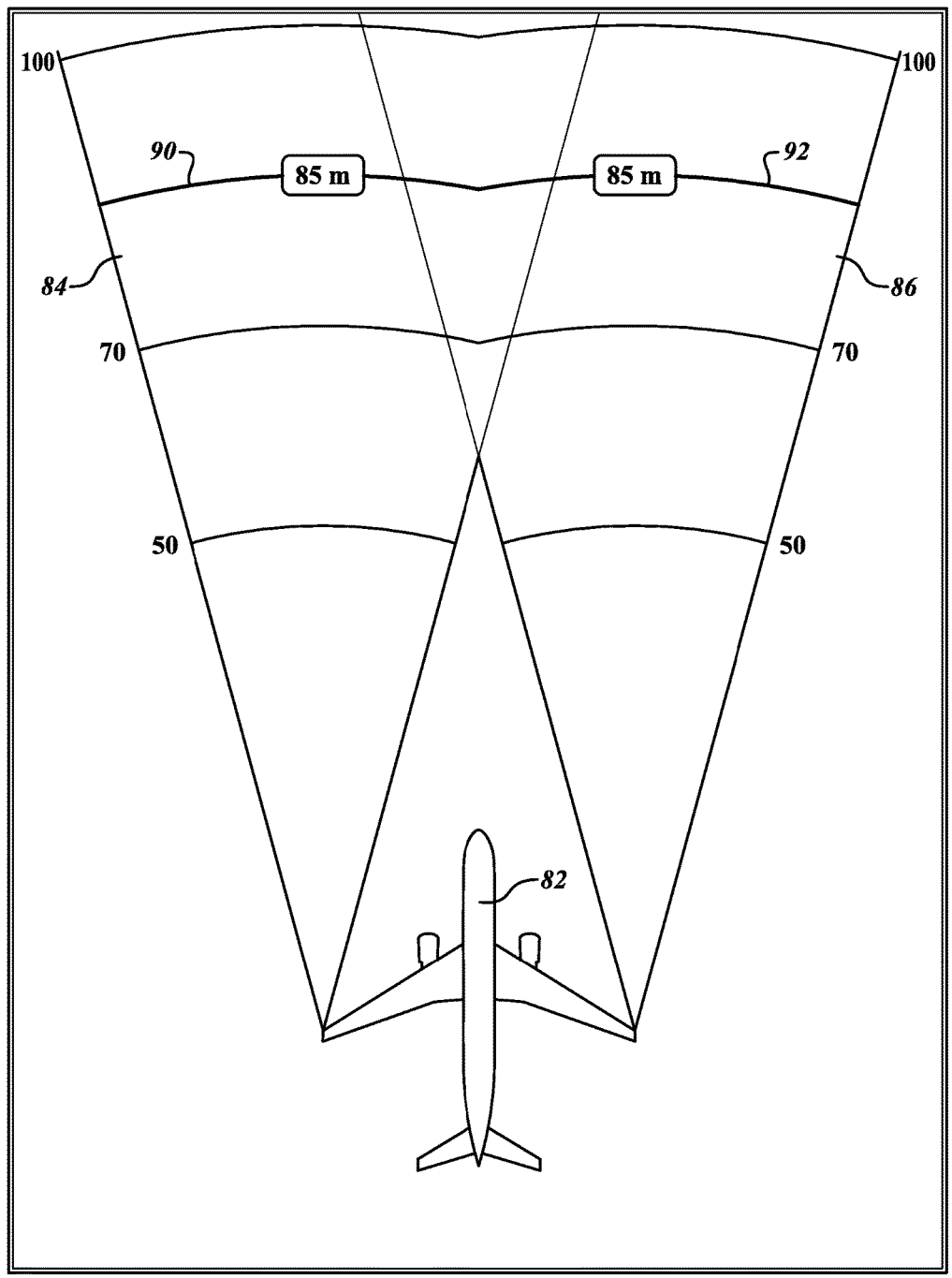

As shown in FIG. 4, the nearest obstacle has been identified as being in the field of view of both the left and right wingtip sensors 26. The obstacle has been determined to be 85 m from the host aircraft. Thus, the arced lines 90, 92 in the coverage areas 84, 86 are illuminated with an associated distance marker. Other types of icons may be presented.

Figure 5:
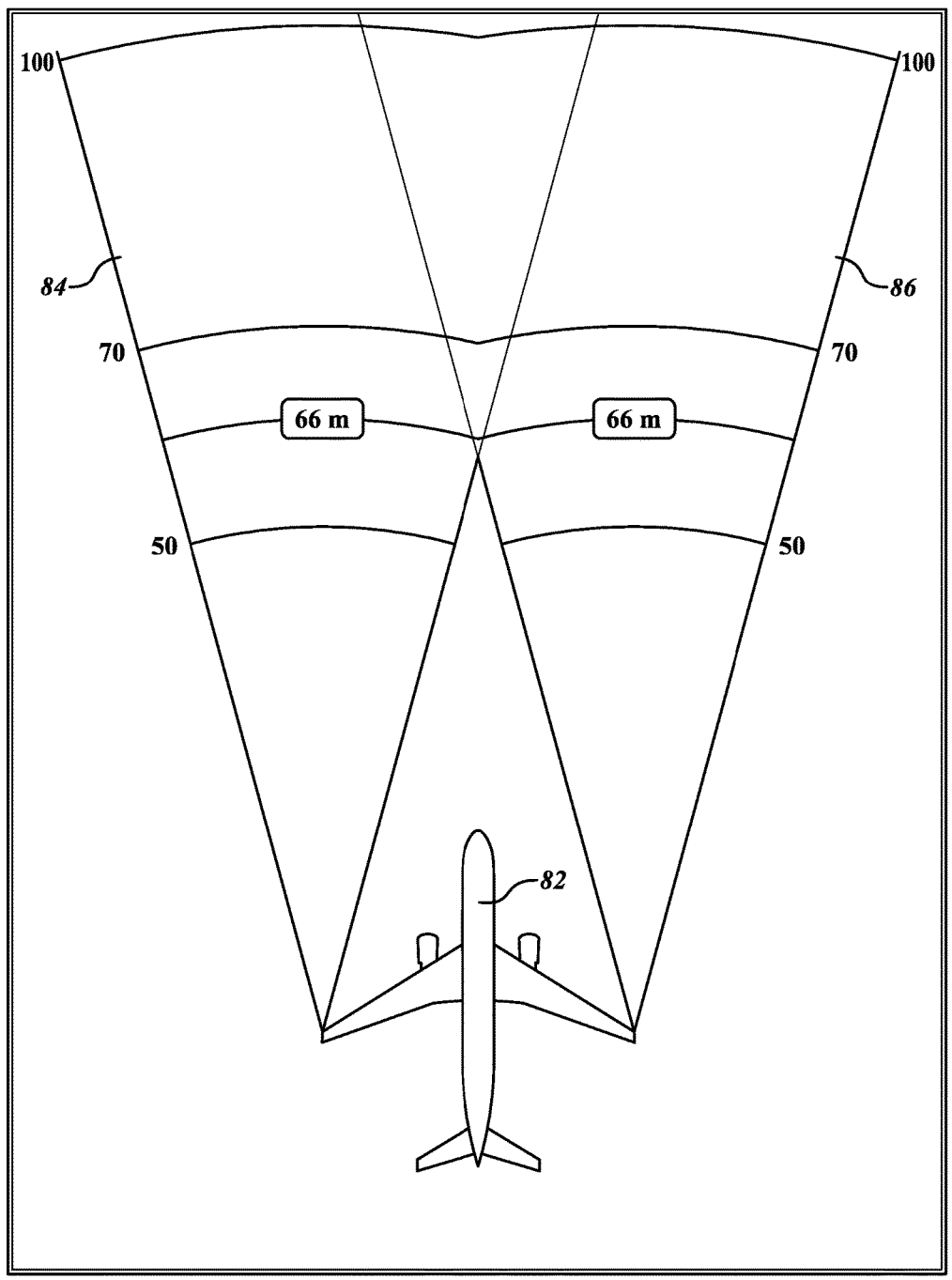

As shown in FIG. 5, the nearest obstacle has been located at 66 m.

Figure 6:
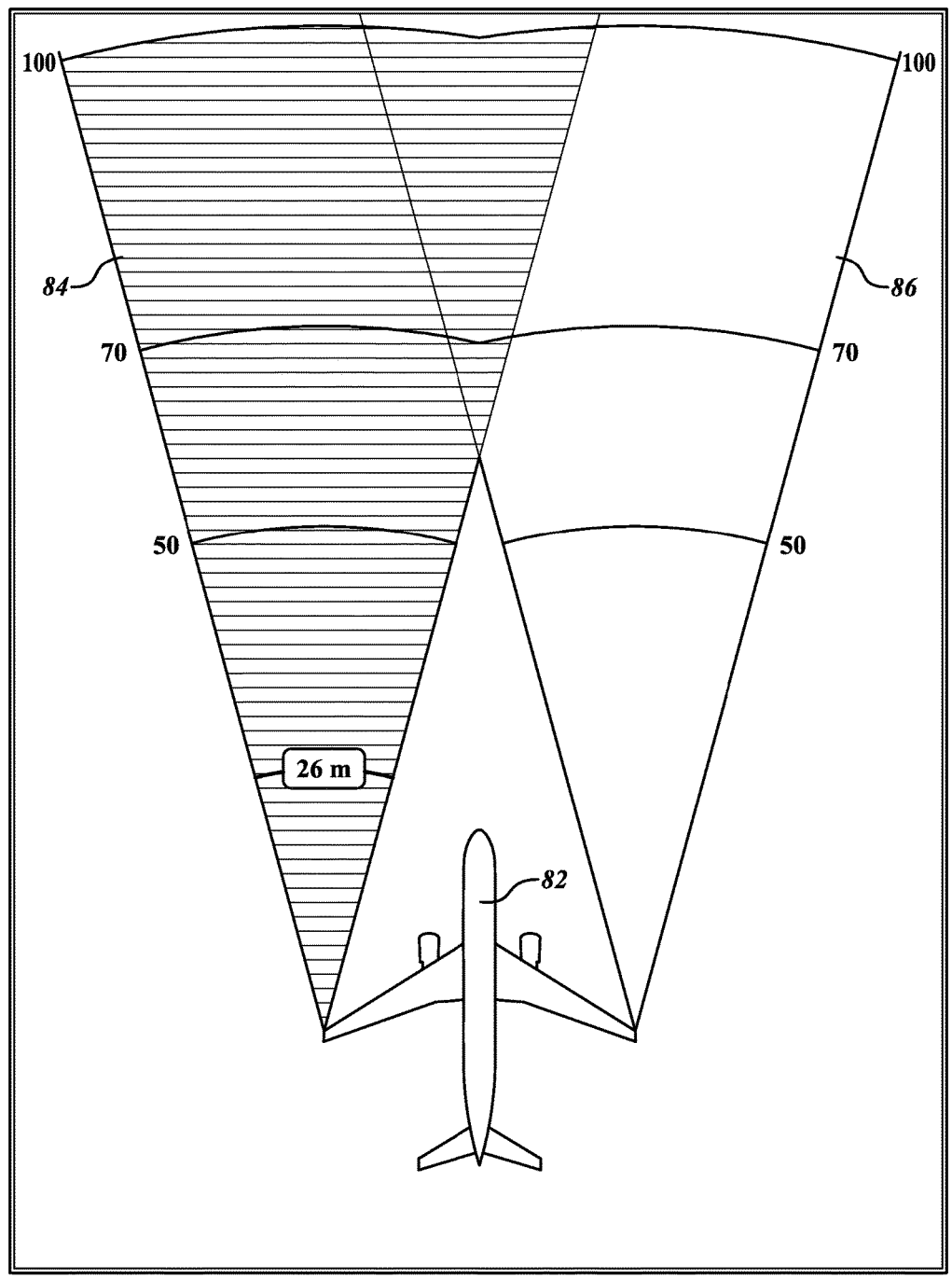

As shown in FIG. 6, only the sensor 26 located in the port wingtip has identified the nearest obstacle at 26 m. Thus, the left coverage area 84 is illuminated differently than the right coverage area 86 and the 26 m line is visually identified. Other type of cone shading can be applied. For example, if the nearest obstacle is between 100 and 70 meters away, the area of cone above 70 m is filled with blue. When the nearest obstacle is between 70 and 50 m then the area of cone between 50-100 m is filled. When the nearest obstacle is below 50 m, the whole cone is filled.

Figure 7:
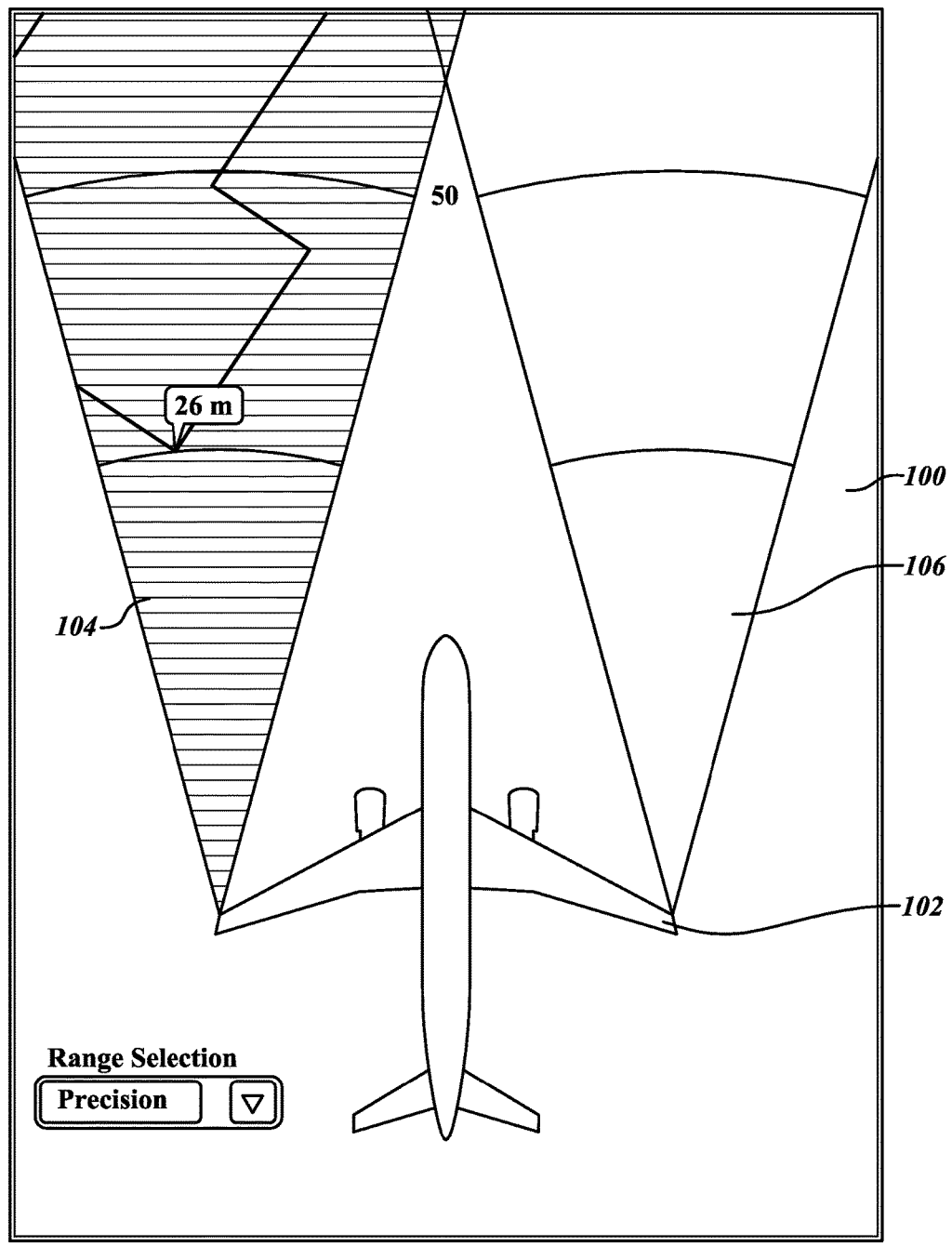

As shown in FIG. 7, a precision mode image 100 is presented, based upon a user's request or automatically, based on the sensing of an obstacle within a predefined threshold. In the precision mode image 100, an aircraft icon 102 is larger and left and right coverage areas 104, 106 have a lower range limit than that shown in FIG. 4. Also, an outline of the obstacle is presented within the coverage area(s) 104, 106 if shape information of the obstacle is available from the database 60 or some other source.

Figure 8:
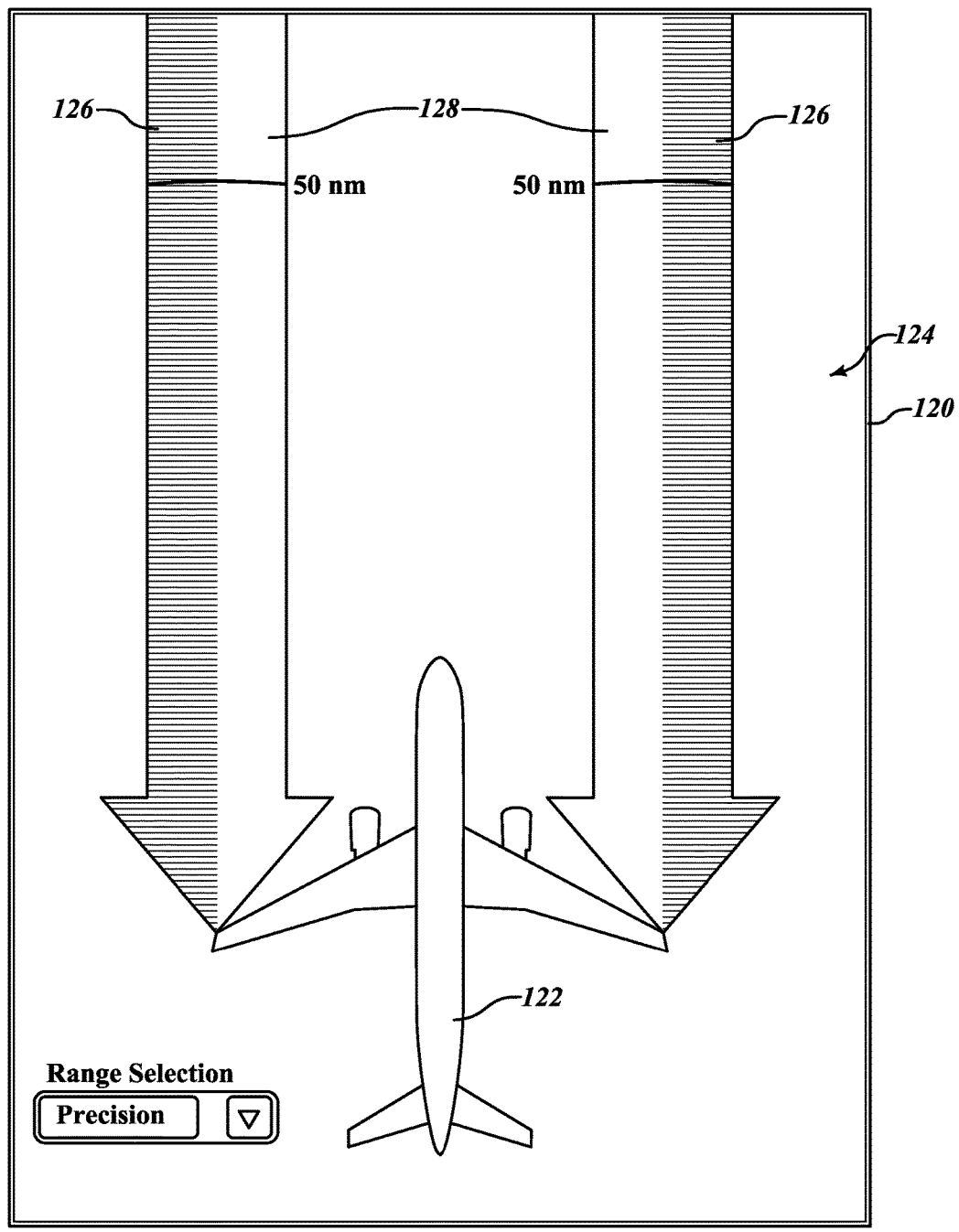
Figure 9:
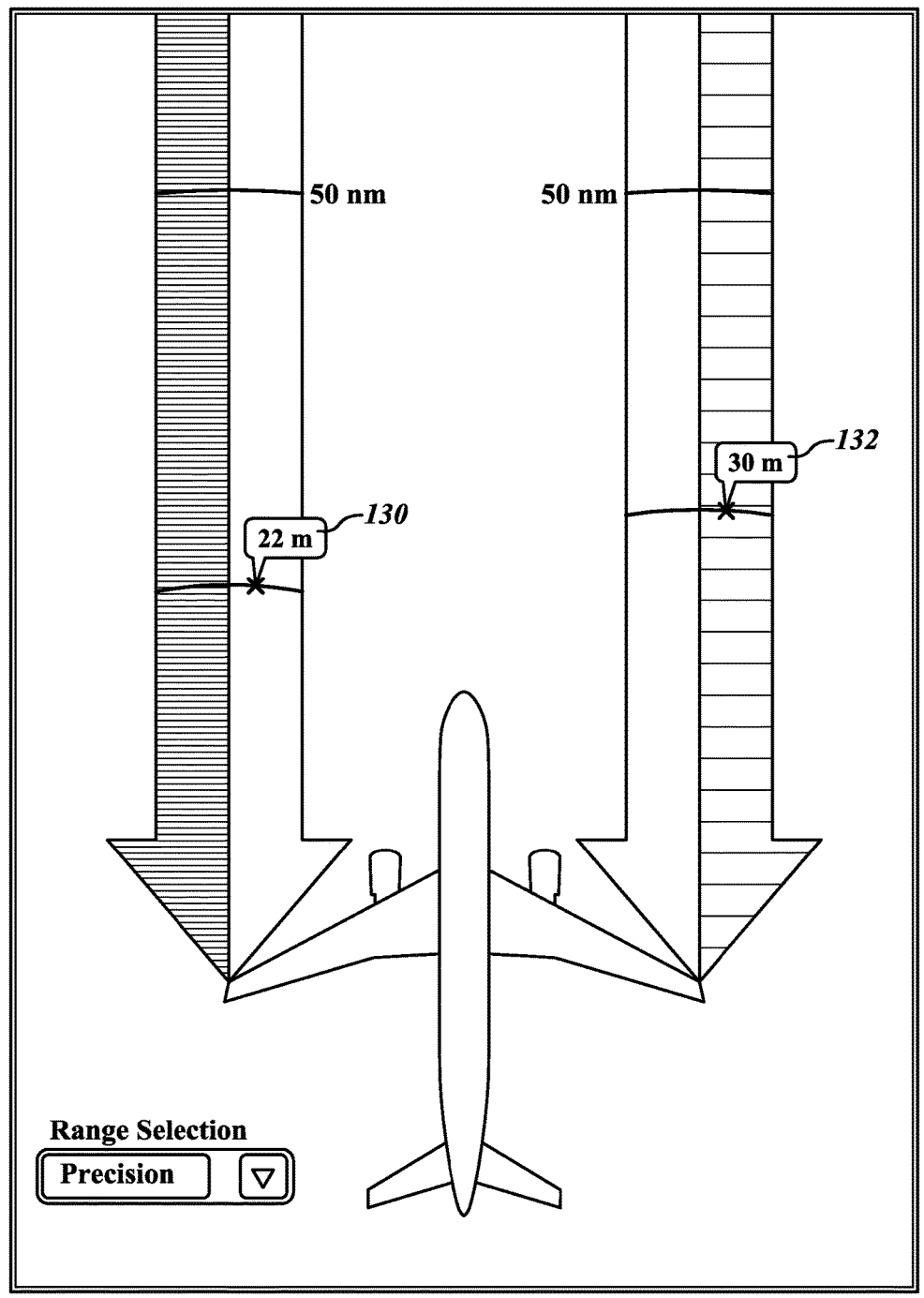
Figure 10:
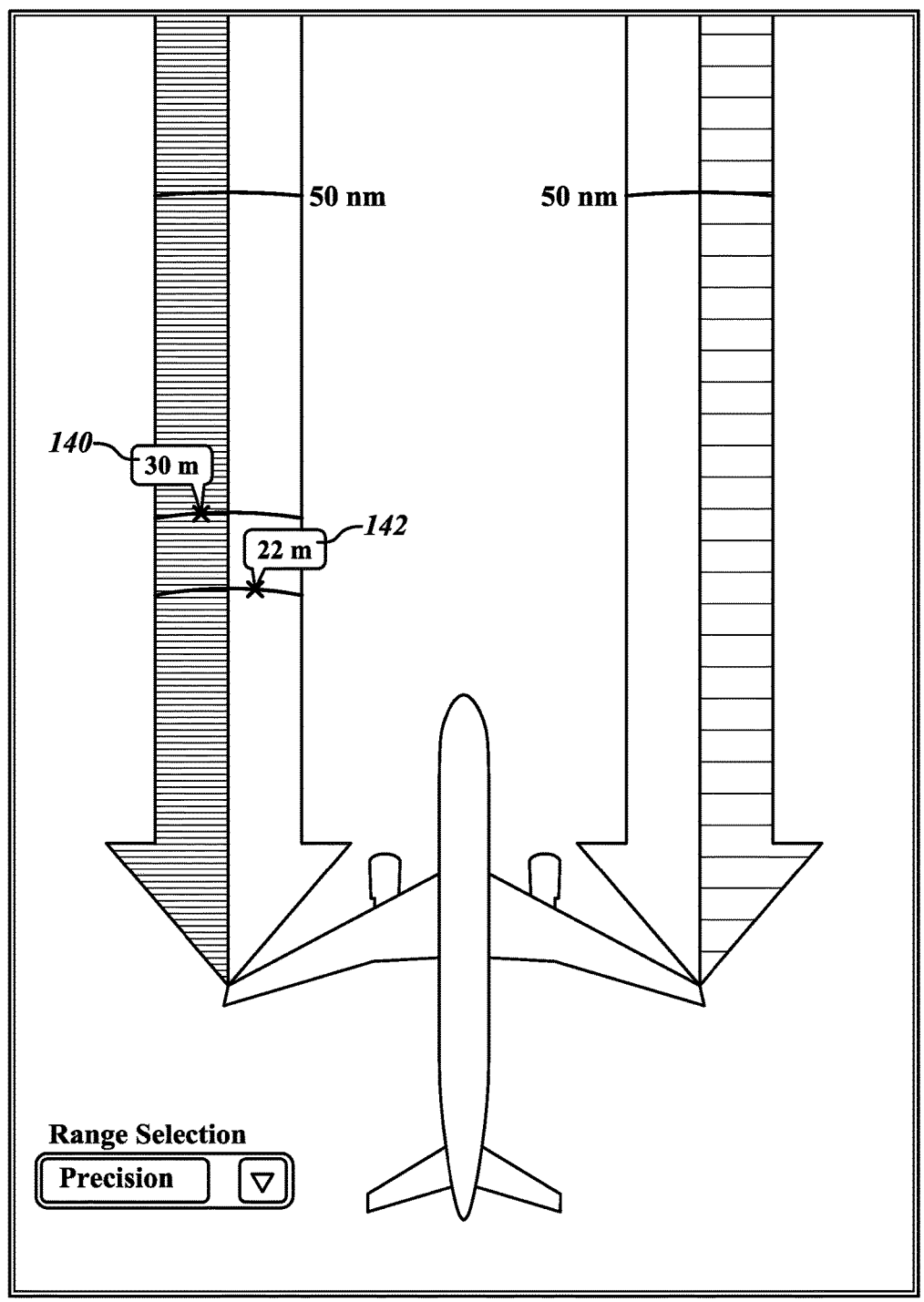

As shown in FIGS. 8-10, an alternate wingtip threat display approach is shown that provides inboard and outboard zone alerts. These two zones are based on the position of the object and the assumption that the aircraft will strike the object if the aircraft continues on its currently commanded path.

The processor 36 or 50 determines, based on sensor data or other source such as an airport database, whether a detected object is in a detection area (i.e., in front of the aircraft) and is either outside the sweep of the wing (outboard zone) or inside the sweep of the wing (inboard zone). If the detected object is in the outboard zone then the object is safe to pass. If the detected object is in the inboard zone then a maneuver or a stop is necessary. The zones can be used to protect other aircraft parts (e.g., the nose, tail, and cowling).

As shown in FIG. 8, a wingtip alert image 120 includes a silhouette of the aircraft 122. At a minimum, only the aircraft's wings are shown for sense of scale with a sensor area 124. The sensor area 124 region includes two zones 126, 128. A first zone 126 (outboard zone) is a "safe" zone, in which any detected object that resides in the "safe" zone will result in the aircraft avoiding any contact with the object. The second zone 128 (inboard zone) is a "threat" zone, where any objects that reside in it will be struck by the aircraft if the aircraft continues its current course. A "margin of safety" may be included in the zone boundary definitions. In FIG. 8, no targets/objects appear in the first or second zones 126, 128.

As shown in FIGS. 9 and 10, the closest objects/targets in the first and second regions are shown. Color, texture and/or position of an icon indicate what region the objects are in. As shown in FIG. 9, a first target is identified by a range line and distance call-out 130 in the left region's "threat" zone at 22 m. A second target is identified by a range line and distance call-out 132 in the right region's "safe" zone at 30 m.

As shown in FIG. 10, the closest safe object is identified by range line and call-out 140 in the left region's "safe" zone at 30 m. The closest threat object is identified by range line and call-out 142 in the left region's "threat" zone at 22 m. This embodiment allows the monitoring of actual threats that are farther away.

Figure 11:
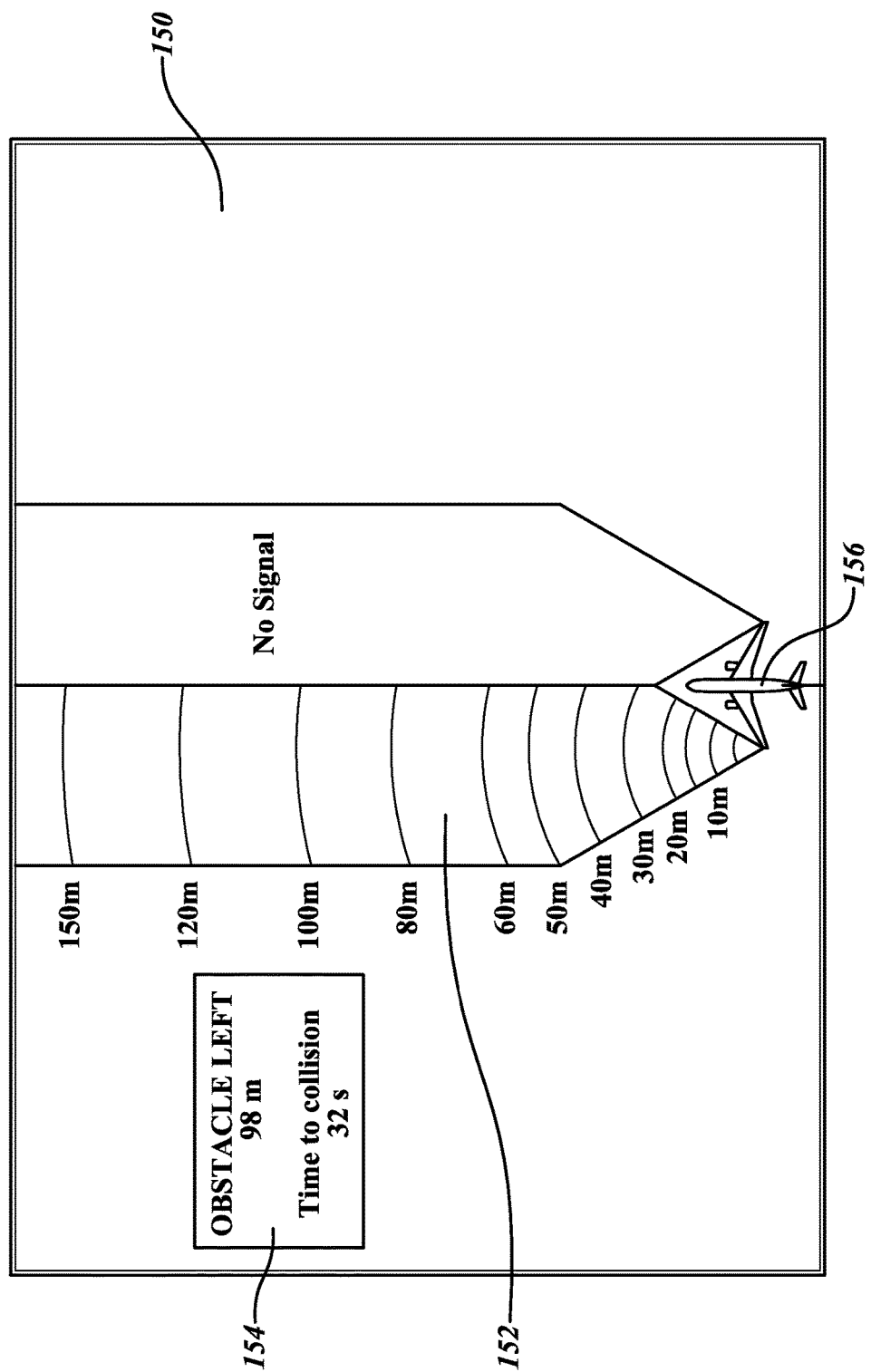

As shown in FIG. 11, right and left regions 150, 152 are presented in front of an ownship icon 156. An obstacle pop-up box 154 appears next to the left region 152 when an obstacle has been detected. The obstacle pop-up box 154 provides information relating to the nearest obstacle that poses a threat. Here an obstacle is identified at 98 m in the left region 152. A time-to-collision has been determined based on aircraft speed and trajectory information and movement information relating to the obstacle. The time to collision is presented in the obstacle pop-up box 154. The right region 150 has not received an adequate signal from the associated sensor(s) (starboard wingtip and/or tail).

All embodiments described above may be augmented with a sound alarm. If the target is in the "threat" zone, it can be communicated to the pilot via a sound alarm/notification. The sound alarm may become more salient as the potential threat is becoming more imminent (the time to collision decreases). The salience of the sound signal might be represented, for example, by gradually increasing volume, pitch, and/or frequency (i.e., reducing interval between soundings) of the sound alarm. Based on information obtained from other avionic systems (or entered manually by crewmembers) about the current aircraft state (e.g., groundspeed, acceleration, heading, turn rate, attitude, surface conditions, etc.) the trajectory of the aircraft's wingtips is predicted. In one embodiment, the prediction of wingtip vector is time based, e.g., 10 or 15 s prediction of the wingtip trajectory. In another embodiment, the vector prediction is distance based, e.g., prediction of the wingtip trajectory for the next 100 ft (30 m). Note that data about the aircraft's state can also be datalinked from ground systems located on the airport surface (e.g., ground radar-derived groundspeed datalinked to the aircraft). In other embodiments, vectors can project from other aircraft features.

Combining information about the predicted wingtip trajectory with information on an obstacle's location and geometry provides a basis for enhanced awareness and alerting about potential collisions to pilots. The location of obstacles is based on a combination of wingtip radar returns, aircraft surveillance data, such as automatic dependent surveillance-broadcast (ADS-B), and/or an airport moving map database (e.g., location of buildings, towers, etc., on the airport surface). The ADS-B type of data provides aircraft-type data and an onboard database provides a look-up table for aircraft geometry. Other alternative means that could be used to detect the precise location of obstacles include (but are not limited to) datalinked ground radar returns, traffic information services-broadcast (TIS-B), and system-wide information management (SWIM) data in a future environment.

The relative location of the obstacles and the wingtip vectors provides enhanced awareness on the display. The processor 36 or 50 identifies a threat when the wingtip vector(s) penetrate an obstacle. A visual and/or aural alert is presented to the flight crew. Alternatively, the processor 36 or 50 identifies a threat when the wingtip vector(s) penetrate a safety clearance envelope around the obstacle. This system ensures that pilots are not only aware of the obstacle's location, but also that any taxi maneuvers provide sufficient clearance.

Figure 12:
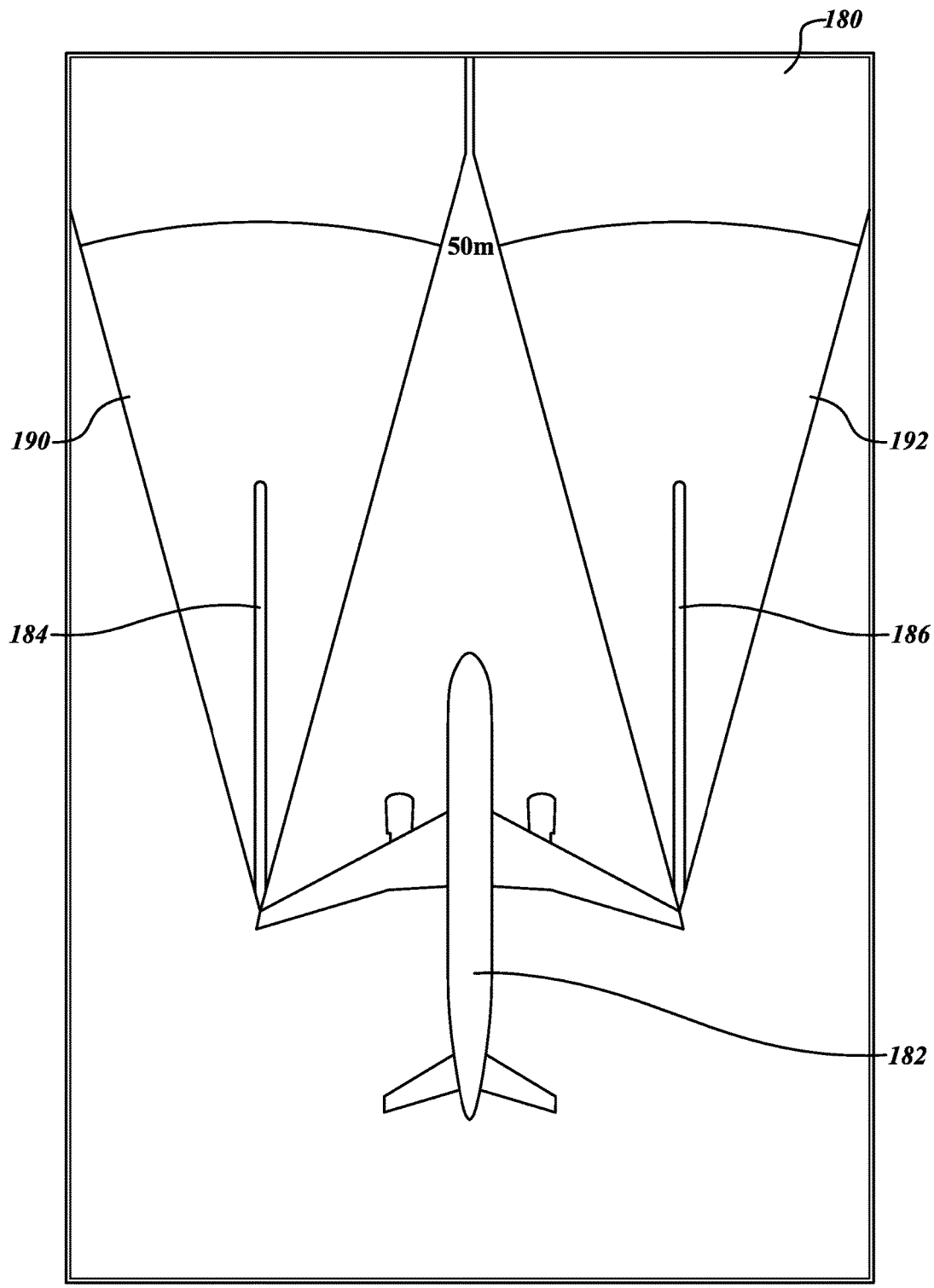

As shown in FIG. 12, a moving map image 180 presents an ownship icon 182 with dynamically calculated wingtip trajectory vectors 184, 186 and sensor coverage areas 190, 192 emanating from the wingtips of the ownship icon 182.

Some possible implementations of this concept are included below and, while they are shown on an electronic display, the invention is not limited to this type of display. For instance, the present invention could be implemented using simple lights and/or aural indications to indicate safe/unsafe wingtip trajectory and relative location of obstacles.

The estimation of the wingtip's trajectory is based on the computation of airplane curve radius from scalar velocity information obtained from the left and right sensors or from other sources. The wingtip trajectory information may be combined with the "threat" and "safe" zones shown in FIGS. 8-10 (i.e., zone split lines are represented by the estimated trajectory of the wingtip).

Figure 13:
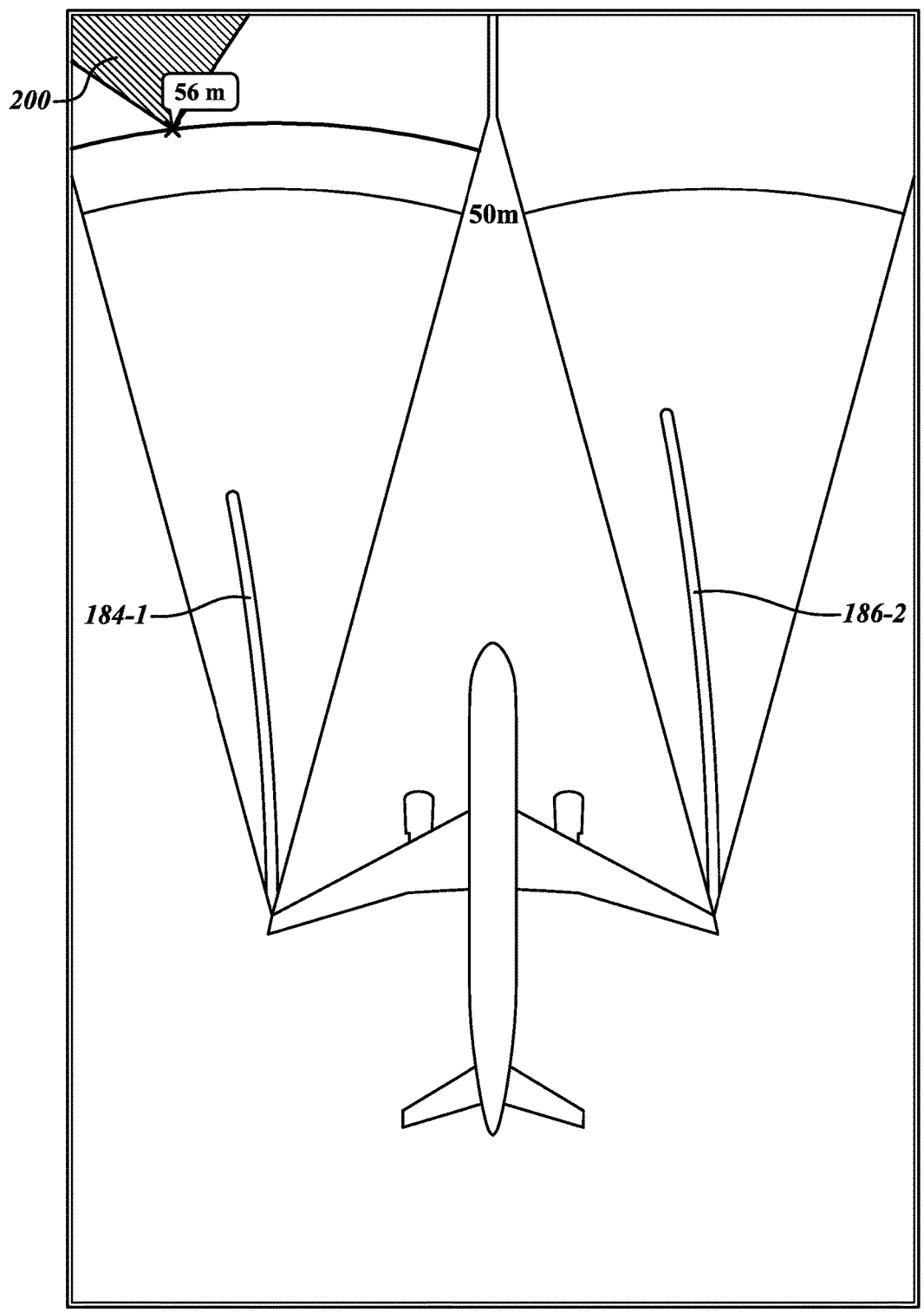

FIG. 13 shows wingtip trajectory vectors 184-1, 186-2 that show curvature. An obstacle 200 has been sensed at 56 m in the left sensor coverage area 190.

Figure 14:
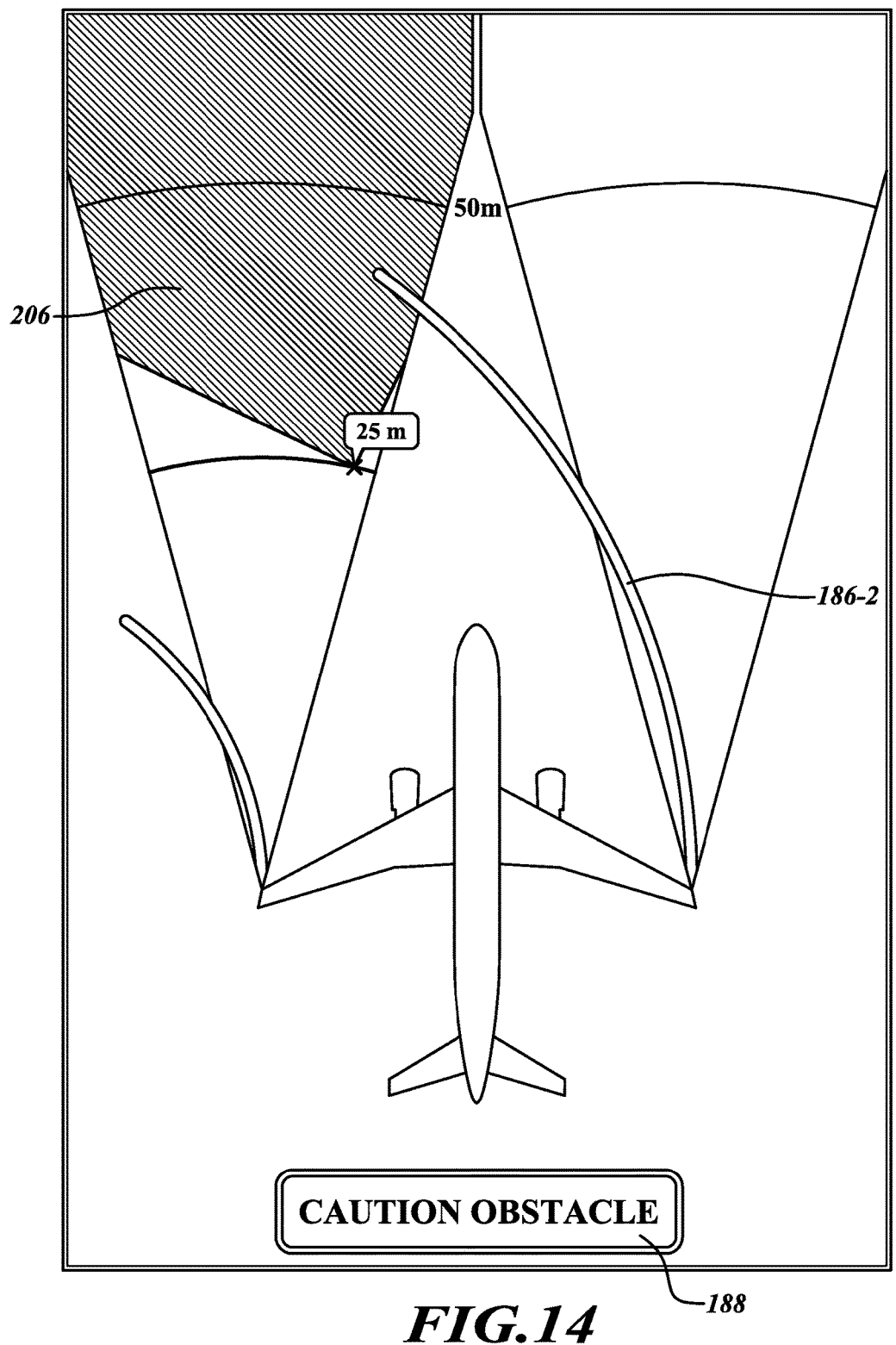

FIG. 14 shows the starboard wingtip is projected to collide with an obstacle during left turn, as shown by the starboard wingtip trajectory vector 186-2 coming in contact with an obstacle icon 206 at 25 m. Visual coding such as an amber starboard vector, or amber obstacle can be used to enhance awareness of the conflicting obstacle.

Figure 15:
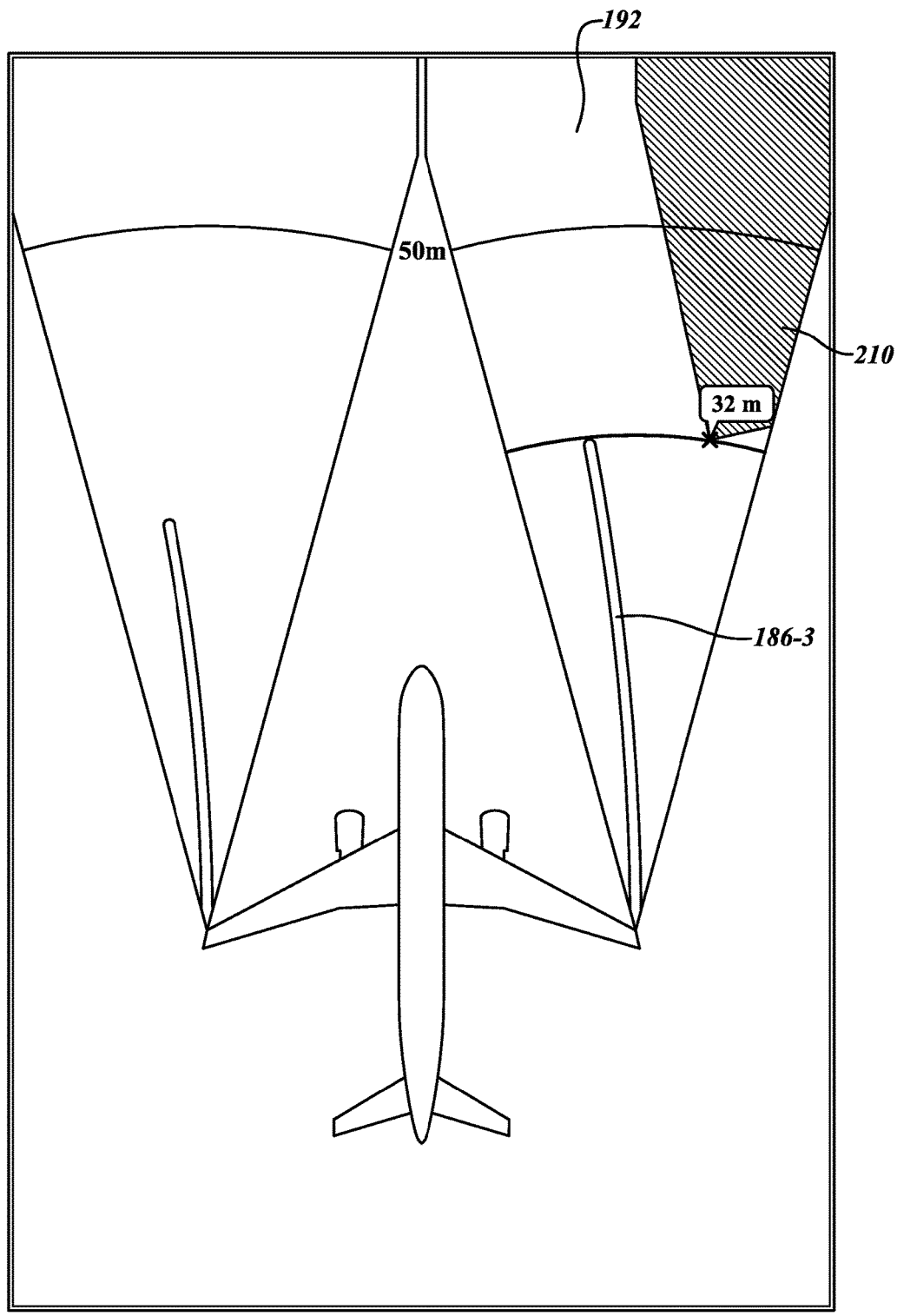

FIG. 15 shows projected wingtip trajectory that will clear a sensed obstacle. An obstacle icon 210 is presented in the right sensor coverage area 192. A wingtip trajectory vector 186-3 is presented with a left curve and does not come in contact with the obstacle icon 210. This indicates that the corresponding wingtip will clear the associated obstacle as long as the aircraft continues its current turn.

All the awareness and alerting artifacts introduced above can be presented on either two-dimensional or three-dimensional displays, such as an airport moving map (FIGS. 16 and 17) or projected on an HUD type device.

Figure 16:
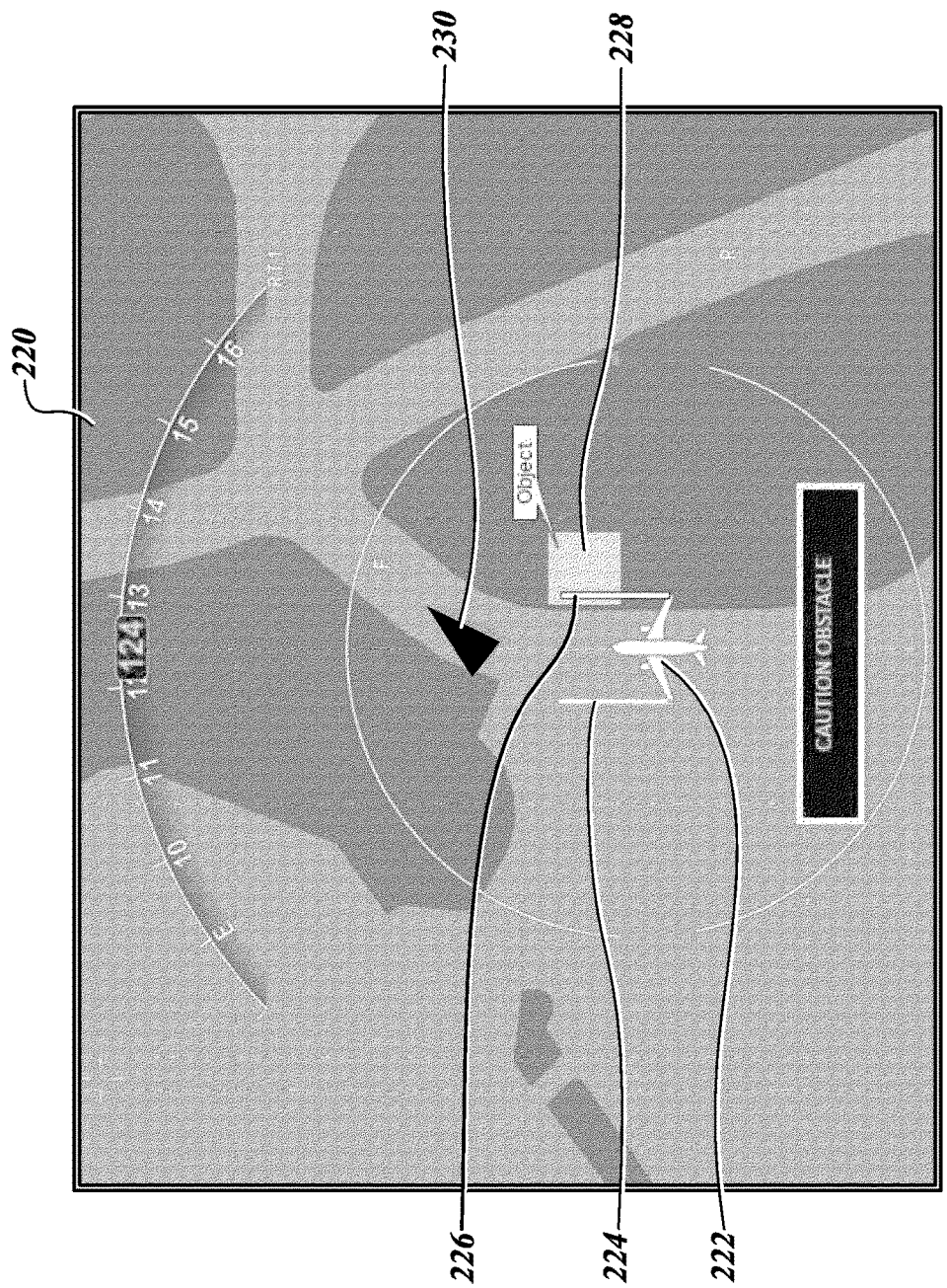

As shown in FIG. 16, a two-dimensional moving map display 220 includes an ownship icon 222 with wingtip trajectory vectors 224, 226 projected from wingtips of the ownship icon 222. The starboard vector 226 intersects an object icon 228, thus indicating a potential collision event. The starboard vector 226 is presented differently (i.e., color, pattern, flashing) from the port vector 224 that is projected to be clear of any obstacles. A traffic icon 230 is presented, based on information received in a data transmission (e.g., ADS-B).

Figure 17:
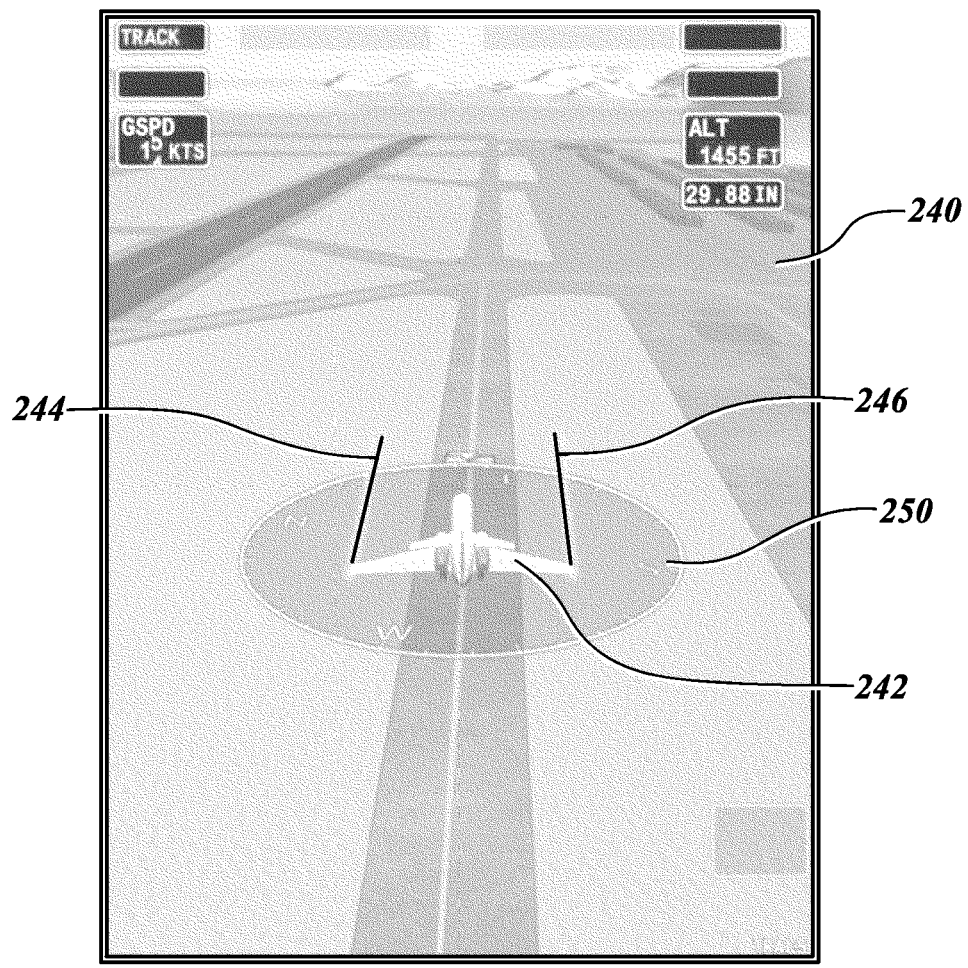

As shown in FIG. 17 an aft, elevated perspective view image 240 presents an ownship icon 242 with wingtip trajectory vectors 244, 246 projected from wingtips of the ownship icon 242. Also presented is a compass icon 250 centered over the ownship icon 242. The compass icon 250 provides compass heading of the ownship.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system comprising:
   a processor configured to:
      receive sensor information from one or more sensors mounted in at least one of a wingtip light module, fuselage, engine cowling, landing gear or tail component of an aircraft, wherein each of the one or more sensors has a field of view that is selected based on a stopping distance range of the aircraft,
      determine a braking distance for the aircraft based on a weight and a current speed of the aircraft,
      determine a trajectory of at least one aircraft element based on a location of the at least one aircraft element, the current speed of the aircraft, and a heading of the aircraft,
      detect at least one obstacle based on the received sensor information and the determined aircraft braking distance, and
      generate an image comprising:
         an ownship icon comprising at least one feature representing the at least one wingtip light module, fuselage, engine cowling, landing gear, or tail component of the aircraft,
         a first vector generated based on the determined trajectory of an associated aircraft element,
         a second vector generated based on the determined trajectory of an associated aircraft element, wherein the first vector and the second vector are based on at least one of a distance value or a time value, and
         at least one indicator associated with the detected at least one obstacle; and
   a display device configured to present the generated image.

2. The system of claim 1, wherein the at least one feature comprises a first feature representing a port wing and a second feature representing a starboard wing of the aircraft, wherein the generated image comprises a first sense coverage area and a second sense coverage area, wherein the display device presents a tip of the first sense coverage area adjacent the first feature and a tip of the second sense coverage area adjacent the second feature, wherein the at least one indicator is presented within at least one of the coverage areas.

3. The system of claim 2, wherein the coverage areas and the ownship icon are presented in a one-to-one relationship and the coverage areas and the ownship icon are presented in one of at least two different range resolutions.

4. The system of claim 2, wherein the at least one indicator comprises a range feature of at least one of the coverage areas, wherein the range feature corresponds to obstacle distance information included in at least one of the received sensor or stored information.

5. The system of claim 2, wherein the at least one indicator comprises a distance value located in at least one of the coverage areas, wherein the distance value corresponds to obstacle distance information included in the received sensor information.

6. The system of claim 2, further comprising:
   memory configured to store airport facility information,
   wherein the at least one indicator comprises at least a partial outline of the at least one determined obstacle based on at least one of the received sensor information or the stored airport facility information, and
   wherein the at least a partial outline is presented within at least one of the coverage areas.

7. The system of claim 1, wherein the generated image comprises:
   a first zone associated with first areas outside the aircraft, the first areas being one where, if an obstacle was detected therein, the aircraft would avoid contact based on current heading of the aircraft; and
   a second zone associated with a second area outside the aircraft, the second area being one where, if an obstacle was detected therein, the aircraft would be likely to collide with the obstacle based on current heading of the aircraft.

8. The system of claim 7, wherein a first portion of the first zone and a first portion of the second zone are presented from a port wingtip of the ownship icon, and wherein a second portion of the first zone and a second portion of the second zone are presented from a starboard wingtip of the ownship icon.

9. The system of claim 8, wherein the at least one indicator comprises a nearest obstacle icon presented in a first format in one of the zone portions based on the sensor information, and wherein the at least one indicator comprises a next-nearest obstacle icon presented in a second format in one of the zone portions based on the sensor information.

10. The system of claim 8, wherein the at least one indicator comprises a nearest obstacle icon in the first zone presented in a first format in one of the zone portions of the first zone based on the sensor information, and wherein the at least one indicator comprises a nearest obstacle icon in the second zone presented in a second format in one of the zone portions of the second zone based on the sensor information.

11. The system of claim 1, wherein the determined trajectories are not linear.

12. A method comprising:
   at a processor,
      receiving sensor information from one or more sensors mounted in at least one aircraft feature, wherein each of the one or more sensors has a field of view that is selected based on a stopping distance range of the aircraft;

determining a braking distance for the aircraft based on a weight and a current speed of the aircraft;

determining a trajectory of at least one aircraft element based on a location of the at least one aircraft element, the current speed of the aircraft, and a heading of the aircraft;

detecting at least one obstacle based on the received sensor information and the determined aircraft braking distance; and generating an image comprising:

an ownship icon comprising the at least one aircraft feature;

a first vector generated based on the determined trajectory of an associated aircraft element;

a second vector generated based on the determined trajectory of an associated aircraft element, wherein the first vector and the second vector are based on at least one of a distance value or a time value; and at least one indicator associated with the detected at least one obstacle; and at a display device, presenting the generated image.

13. The method of claim 12, wherein the at least one feature comprises a first feature representing a port wing and a second feature representing a starboard wing of the aircraft, wherein the generated image comprises a first sense coverage area and a second sense coverage area, wherein presenting comprises presenting a tip of the first sense coverage area adjacent the first feature and a tip of the second sense coverage area adjacent the second feature, wherein the at least one indicator is presented within at least one of the coverage areas.

14. The method of claim 13, wherein the coverage areas and the ownship icon are presented in a one-to-one relationship and the coverage areas and the ownship icon are presented in one of at least two different range resolutions.

15. The method of claim 13, wherein generating the image comprising the at least one indicator comprises uniquely depicting a range feature of at least one of the coverage areas, wherein the uniquely depicted range feature corresponds to obstacle distance information included in the received sensor information.

16. The method of claim 13, wherein the at least one indicator comprises a distance value located in at least one of the coverage areas, wherein the distance value corresponds to obstacle distance information included in the received sensor information.

17. The method of claim 13, wherein the at least one indicator comprises at least a partial outline of the at least one determined obstacle, and wherein generating the image comprises presenting the at least the partial outline within at least one of the coverage areas based on at least one of the received sensor information or airport facility information stored by a memory.

18. The method of claim 12, wherein the generated image comprises:

a first zone associated with first areas outside the aircraft, the first areas being one where, if an obstacle was detected therein, the aircraft would avoid contact based on current heading of the aircraft; and a second zone associated with a second area outside the aircraft, the second area being one where, if an obstacle was detected therein, the aircraft would be likely to collide with the obstacle based on current heading of the aircraft.

19. The method of claim 18, wherein a first portion of the first zone and a first portion of the second zone are presented from a port wingtip of the ownship icon, wherein a second portion of the first zone and a second portion of the second zone are presented from a starboard wingtip of the ownship icon, wherein the at least one indicator comprises a nearest obstacle icon presented in a first format in one of the zone portions based on the sensor information, and wherein the at least one indicator comprises a next-nearest obstacle icon presented in a second format in one of the zone portions based on the sensor information.

* * * * *